(12) United States Patent
Sweet (10) Patent No.: US 7,708,010 B2
(45) Date of Patent: May 4, 2010

(54) SOLAR HEATING SYSTEMS (75) Inventor: David Sweet, Old Saybrook, CT (US)

(73) Assignee: Taco Inc., Cranston, RI (US)

( * ) Notice: Subject to any disclaimer, the term of this patent is extended or adjusted under 35 U.S.C. 154(b) by 19 days.

(21) Appl. No.: 11/681,983

(22) Filed: Mar. 5, 2007

(65) Prior Publication Data
US 2008/0216986 A1    Sep. 11, 2008

(51) Int. Cl.
    *F24J 2/42* (2006.01)
(52) U.S. Cl. .................. 126/609; 126/610; 126/611; 126/640
(58) Field of Classification Search .......... 126/640, 126/609, 610, 611; 237/69
    See application file for complete search history.

(56) References Cited

U.S. PATENT DOCUMENTS

| | | | | |
|---|---|---|---|---|
| 2,396,338 A | * | 3/1946 | Newton | 165/236 |
| 3,107,052 A | * | 10/1963 | Garrison | 126/591 |
| 3,980,071 A | * | 9/1976 | Barber, Jr. | 126/606 |
| 3,986,489 A | * | 10/1976 | Schlesinger | 126/587 |
| 3,998,207 A | * | 12/1976 | Watt | 126/587 |
| 4,007,776 A | * | 2/1977 | Alkasab | 165/236 |
| 4,034,738 A | * | 7/1977 | Barber, Jr. | 126/586 |
| 4,109,639 A | * | 8/1978 | Keegan | 126/588 |
| 4,129,118 A | * | 12/1978 | Banke | 126/597 |
| 4,143,642 A | * | 3/1979 | Beaulieu | 126/585 |
| 4,143,814 A | * | 3/1979 | Hill, Jr. | 126/610 |
| 4,167,663 A | * | 9/1979 | Granzow et al. | 219/497 |
| 4,191,166 A | * | 3/1980 | Saarem et al. | 126/585 |
| 4,191,172 A | * | 3/1980 | Walch et al. | 126/587 |
| 4,226,606 A | * | 10/1980 | Yaeger et al. | 62/238.6 |
| 4,248,049 A | * | 2/1981 | Briley | 62/235.1 |
| 4,257,395 A | * | 3/1981 | Wieder | 126/587 |
| 4,281,519 A | * | 8/1981 | Spath et al. | 62/79 |
| 4,324,228 A | * | 4/1982 | Shippee | 126/640 |
| 4,391,268 A | * | 7/1983 | Mathes et al. | 126/640 |
| 4,403,602 A | * | 9/1983 | Warden | 126/610 |
| 4,492,091 A | * | 1/1985 | Whitwell et al. | 62/180 |
| 4,510,922 A | * | 4/1985 | Roussos et al. | 126/636 |
| 4,558,818 A | * | 12/1985 | Harnish | 236/25 R |
| 4,621,613 A | * | 11/1986 | Krumhansl | 126/563 |
| 4,638,147 A | * | 1/1987 | Dytch et al. | 392/485 |
| 4,718,403 A | * | 1/1988 | McCall | 126/586 |
| 5,056,712 A | * | 10/1991 | Enck | 236/20 R |
| 5,248,084 A | * | 9/1993 | Latarius | 237/8 C |
| 5,626,287 A | * | 5/1997 | Krause et al. | 236/20 R |
| 5,643,482 A | * | 7/1997 | Sandelman et al. | 219/497 |
| 5,900,178 A | * | 5/1999 | Johnsen | 219/497 |
| 5,946,937 A | * | 9/1999 | Kujak | 62/476 |
| 6,347,748 B1 | * | 2/2002 | Lyons | 237/69 |

(Continued)

*Primary Examiner*—Kenneth B Rinehart
*Assistant Examiner*—Jorge Pereiro
(74) *Attorney, Agent, or Firm*—Barry G. Magidoff (57) ABSTRACT

Solar heating systems are provided which utilize an integrated fixture for transferring heat from a solar collector to a lower-temperature loop, e.g. a domestic hot water system or radiant heating system. The fixture provides a heat exchanger for transferring heat from the solar collector to the lower temperature loop. The fixture may also include a casting, in which are formed solar collector supply and return ports, lower temperature supply and return ports, a solar collector pump volute, and a lower temperature pump volute. The systems also include two pumps, and a temperature optimization control that varies the speed of at least one of the pumps depending on the temperature of the liquid in the solar collector.

8 Claims, 8 Drawing Sheets

U.S. PATENT DOCUMENTS

| | | | |
|---|---|---|---|
| 6,622,930 B2 * | 9/2003 | Laing et al. | 237/80 |
| 7,044,398 B2 * | 5/2006 | Sweet | 237/69 |
| 2003/0000213 A1 * | 1/2003 | Christensen et al. | 60/670 |
| 2004/0262412 A1 * | 12/2004 | Sweet | 237/16 |
| 2005/0039904 A1 * | 2/2005 | Aler et al. | 165/219 |
| 2006/0016903 A1 * | 1/2006 | Sweet | 237/69 |
| 2006/0034717 A1 | 2/2006 | Castellone et al. | 417/423.14 |
| 2006/0196959 A1 * | 9/2006 | Sweet | 237/67 |

* cited by examiner

SOLAR HEATING SYSTEMS

TECHNICAL FIELD

This invention relates to solar heating systems and heat exchangers for use in such systems.

BACKGROUND

Solar energy, for example energy collected in a roof-mounted solar collector, may be used as a heat source for various types of household or industrial heating, for example radiant heating systems and domestic hot water heating. A radiant heating system is composed of tubing embedded in flooring, walls, or ceilings of the area to be heated, with heated water being pumped through this tubing to raise the temperature of the surface (thermal mass). A typical domestic hot water system includes a domestic hot water heater which supplies potable hot water to a household.

Solar thermal energy is a renewable energy source, and thus utilization of solar thermal energy in heating systems is highly desirable from an environmental perspective. As concern regarding global warming and other undesirable environmental affects of fossil fuels increases, it will become ever more important to provide viable alternative energy sources.

SUMMARY

In one aspect, the present disclosure features a method of supplying energy from a solar heat source to a hot water system, e.g., a hydronic heating system or domestic water heater. The method includes providing an integrated fixture for transferring heat from a higher-temperature loop to a lower-temperature loop, the fixture including: (i) a casting; (ii) higher-temperature supply and return ports formed in a first portion of the casting; (iii) lower-temperature supply and return ports formed in a second portion of the casting; (iv) a higher-temperature loop pump volute formed in the first portion of the casting and configured to accept an impeller of a higher-temperature loop pump; (v) a lower-temperature loop pump volute formed in the second portion of the casting and configured to accept an impeller of a lower-temperature loop pump, and (vi) a heat exchanger in fluid communication with both the higher-temperature loop and the lower-temperature loop. The method further includes heating liquid in the higher-temperature loop with a solar heating unit; delivering liquid from the higher-temperature loop to the fixture through the higher-temperature supply port, so that the liquid passes through a first side of the heat exchanger and leaves the fixture through the higher-temperature return port, and delivering liquid circulating in the lower-temperature loop to the fixture through the lower-temperature return port, so that it passes through a second side of the heat exchanger, receiving heat from the water in the higher-temperature loop, and leaves the fixture through the lower-temperature supply port.

Some implementations include one or more of the following features. The method further includes using the liquid in the lower-temperature loop as potable water. The method further includes adding to the liquid in the higher-temperature loop an additive that would not be suitable for use in potable water, for example a glycol. The step of delivering liquid circulating in the lower-temperature loop to the fixture through the lower-temperature return port may be performed by a domestic hot water heater or, alternatively, by a boiler. The method further includes removing and repairing or replacing the heat exchanger. The solar heating unit comprises a roof-mounted collector.

In another aspect, the present disclosure features a method of supplying heat to a solar hot water system including a higher-temperature loop and a lower-temperature loop, that includes:
(a) providing a transfer system for transferring heat from the higher-temperature loop to the lower-temperature loop, the transfer system comprising (i) a higher-temperature loop pump; (ii) a lower-temperature loop pump, (iii) a heat exchanger in fluid communication with both the higher-temperature loop and the lower-temperature loop; and (iv) a controller, integrated with the heat exchanger and configured to control the operation of the lower-temperature loop pump and higher-temperature loop pump;
(b) heating liquid in the higher-temperature loop with a solar heating unit;
(c) delivering liquid from the higher-temperature loop to the heat exchanger, so that the liquid passes through a first side of the heat exchanger,
(d) delivering liquid circulating in the lower-temperature loop to the heat exchanger so that the liquid passes through a second side of the heat exchanger, receiving heat from the liquid in the higher-temperature loop,
(e) determining the temperature differential between the temperature of the liquid exiting the solar heating unit and the temperature of the liquid in the higher-temperature loop after it has exited the heat exchanger, and
(f) controlling delivery of liquid from the higher-temperature and lower-temperature loops to the heat exchanger based on the temperature differential.

Some implementations include one or more of the following features. The lower-temperature loop includes a reservoir, and the method further comprises measuring the temperature of the liquid in the higher-temperature loop at the exit to the reservoir. The method further includes turning off operation of one or both of the pumps when the temperature differential exceeds a predetermined setpoint. The method further includes turning off operation of one or both of the pumps when the temperature in the reservoir exceeds a predetermined maximum. The method further includes turning off operation of one or both of the pumps when the temperature at the exit of the solar heat source falls below a predetermined minimum. The method further includes activating a heat dump pump when the predetermined maximum is exceeded, and diverting liquid from the lower-temperature loop to a heat dump. The system further includes a supplemental heat source and a reservoir in communication with the lower-temperature loop, and the method further comprises activating a supplemental pump when temperature at the exit of the solar heat source falls below the predetermined minimum, to deliver heated liquid through a supplemental loop from the supplemental heat source to the reservoir.

In yet a further aspect, the disclosure features a solar hot water system comprising: (a) a solar heat source; (b) a higher-temperature loop in fluid communication with the solar heat source; (c) a storage reservoir; (d) a lower-temperature loop in fluid communication with the storage reservoir; and (e) an integrated fixture for transferring heat from the higher-temperature loop to the lower-temperature loop. The integrated fixture includes: (i) a casting; (ii) higher-temperature supply and return ports formed in a first portion of the casting; (iii) lower-temperature supply and return ports formed in a second portion of the casting; (iv) a higher-temperature loop pump volute formed in the first portion of the casting and configured to accept an impeller of a higher-temperature loop pump; (v) a lower-temperature loop pump volute formed in the second portion of the casting and configured to accept an impeller of a lower-temperature loop pump, and (vi) a heat exchanger in fluid communication with both the higher-temperature loop and the lower-temperature loop.

The storage reservoir may comprise a direct fired water heater or, alternatively, a storage tank for a heating system. The system may further comprise a supplemental heat source, and a supplemental pump configured to deliver heated liquid from the supplemental heat source to the storage reservoir.

The details of one or more embodiments of the invention are set forth in the accompanying drawings and the description below. Other features and advantages of the invention will be apparent from the description and drawings, and from the claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

The descriptions below are more than sufficient for one skilled in the art to construct the disclosed implementations. Unless otherwise mentioned, the processes and manufacturing methods referred to are ones known by those working in the art.

Figure 1:
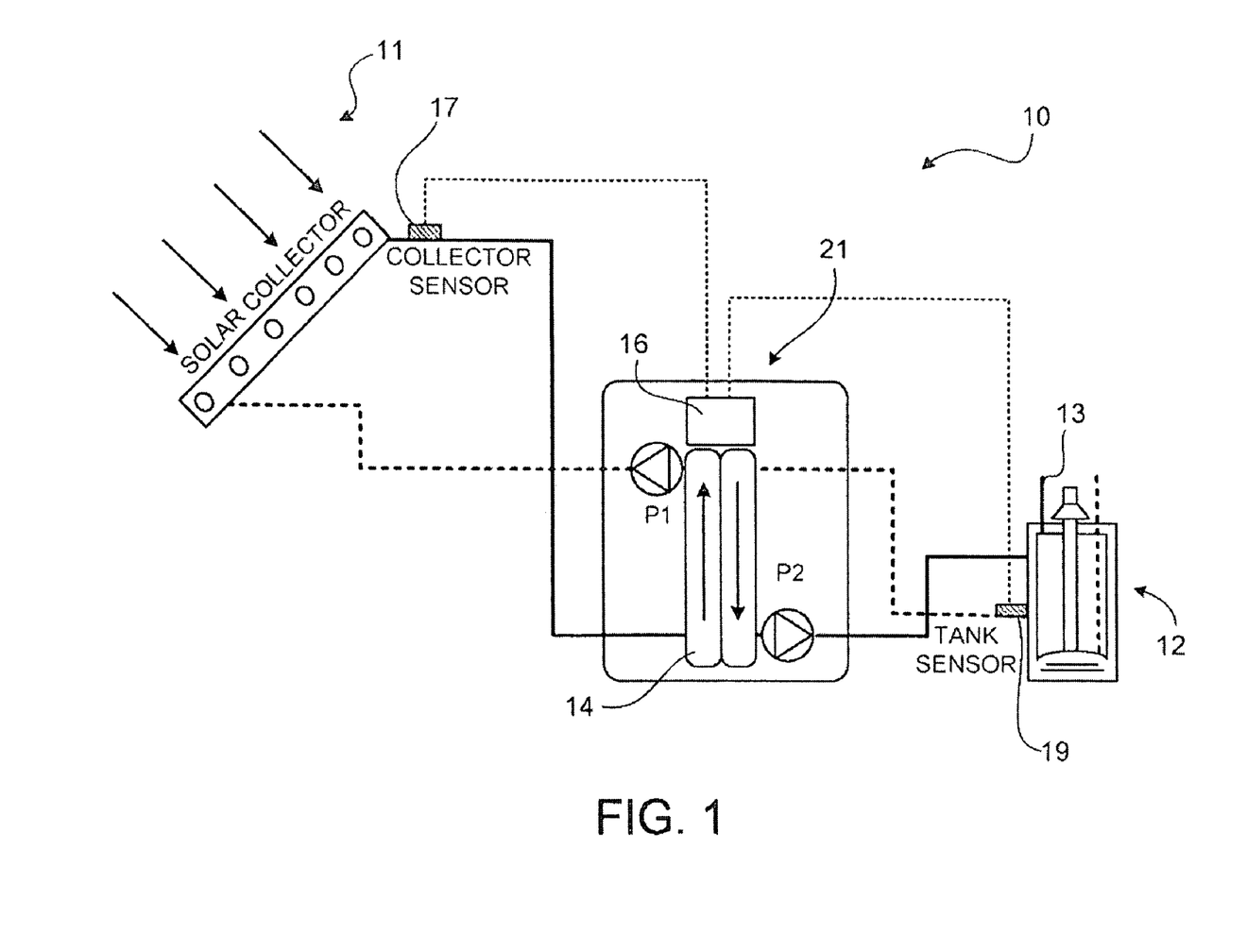
FIG. 1 is a schematic of an arrangement for heating domestic hot water using heat from a solar heat source, utilizing an integrated heat exchange fixture.

FIG. 1 shows a system 10 for heating domestic hot water having a solar heat source. In the implementation shown in FIG. 1, there are two independent circulator pumps: a collector circulator pump P1 circulating water from a solar collector 11 through a solar collector loop, and a water heater circulator pump P2 for circulating water through the water heater 12. The water in the two loops flows through two sides of a heat exchanger 14, in the directions indicated by the arrows in FIG. 1, causing heat to transfer from the water entering the heating loop from the outlet of the solar collector, to the water returning from the water heater 12. The heated water in the water heater then exits the water heater through an outlet line 13 which delivers the hot water to a domestic hot water supply or other use of the hot water, such as a heating system. The system 10 also includes a controller 16, a collector sensor 17, an optional return sensor 18, and a tank sensor 19. Together, these components optimize the functioning of pumps P1 and P2, providing optimized differential temperature control to compensate for changes in the heat supplied by the solar collector under varying weather conditions. This differential temperature control system will now be described in detail.

Controller 16 operates to maintain a setpoint temperature differential ($\Delta T_s$) between the solar collector and the water heater (e.g., a direct fired water heater) and to maintain the temperature at the tank output below a predetermined maximum tank temperature setpoint ($T_{max}$). The tank sensor 19 is mounted on the hot water discharge (outlet to line 13) of the water heater. When the actual temperature differential ($\Delta T_a$) between the collector and tank (measured by the collector sensor 17 and tank sensor 19) is greater than $\Delta T_s$ the controller 16 turns on the water heater pump P2 and the variable speed collector pump P1. The controller 16 operates the collector pump P1 at the minimum speed that will transfer heat from the collector 11 to the water heater 12. As the temperature at the tank sensor 19 approaches $T_{max}$, the controller reduces the output speed of P1. If the temperature measured by the tank sensor rises above $T_{max}$, the controller turns off both P1 and P2. The controller will also shut off both pumps if the temperature measured by the collector sensor 17 falls below a predetermined minimum collector temperature setpoint ($T_{min}$). This prevents circulation of water through the collector loop that has not been adequately heated in the collector. If the return sensor 18 is provided it can be used, with a flow meter, to calculate thermal energy produced by the collector.

The controller 16 may be, for example, a standard microprocessor programmed to perform the functions described above. The sensors may be standard temperature sensors.

Advantageously, the two pumps, P1 and P2, the controller 16, and the heat exchanger 14 are integrated into a unitary heat exchange fixture 21, which will be discussed in detail below.

The heat-exchanger-based water circulating system shown in FIG. 1 may be used in applications in which it is desirable to separate the water in the two loops. For instance, if an antifreeze solution is to protect a roof-mounted solar collector in a cold climate, it may be desirable to isolate the water in the heating unit loop from the antifreeze solution even if the heat source does not supply potable water.

The circulator pumps are typically of the wet rotor circulator type. The pump impeller is received in a mating cavity known as a volute. Typically, the volute is surrounded by a flange to which the pump is attached. When the pump is installed, and the impeller thereby positioned within the volute, water enters the pump through an inlet at the center of the volute, and exits through an outlet in the periphery of the volute.

Figure 2:
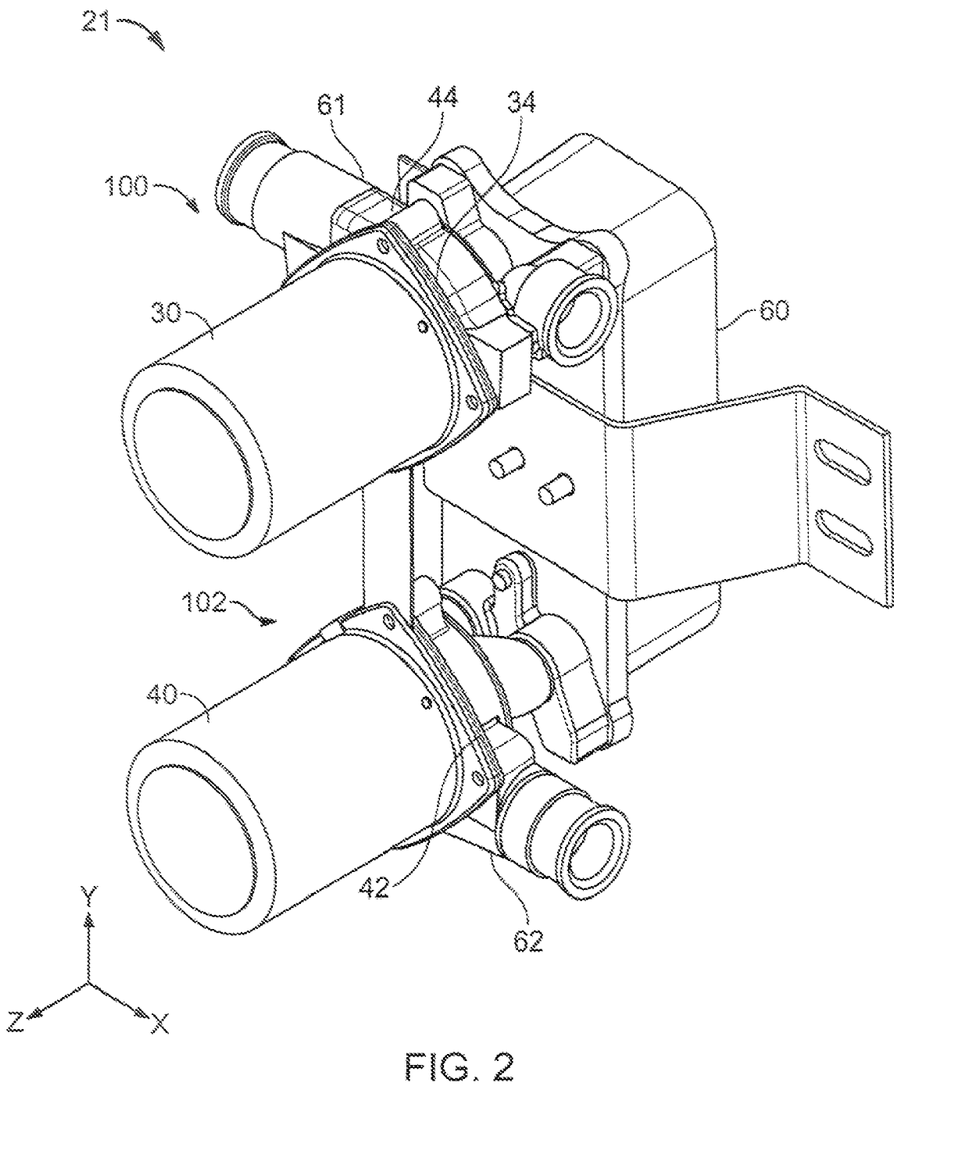
FIG. 2 is a perspective view of the integrated heat exchange fixture used in the implementation of the invention shown in FIG. 1.
Figure 3:
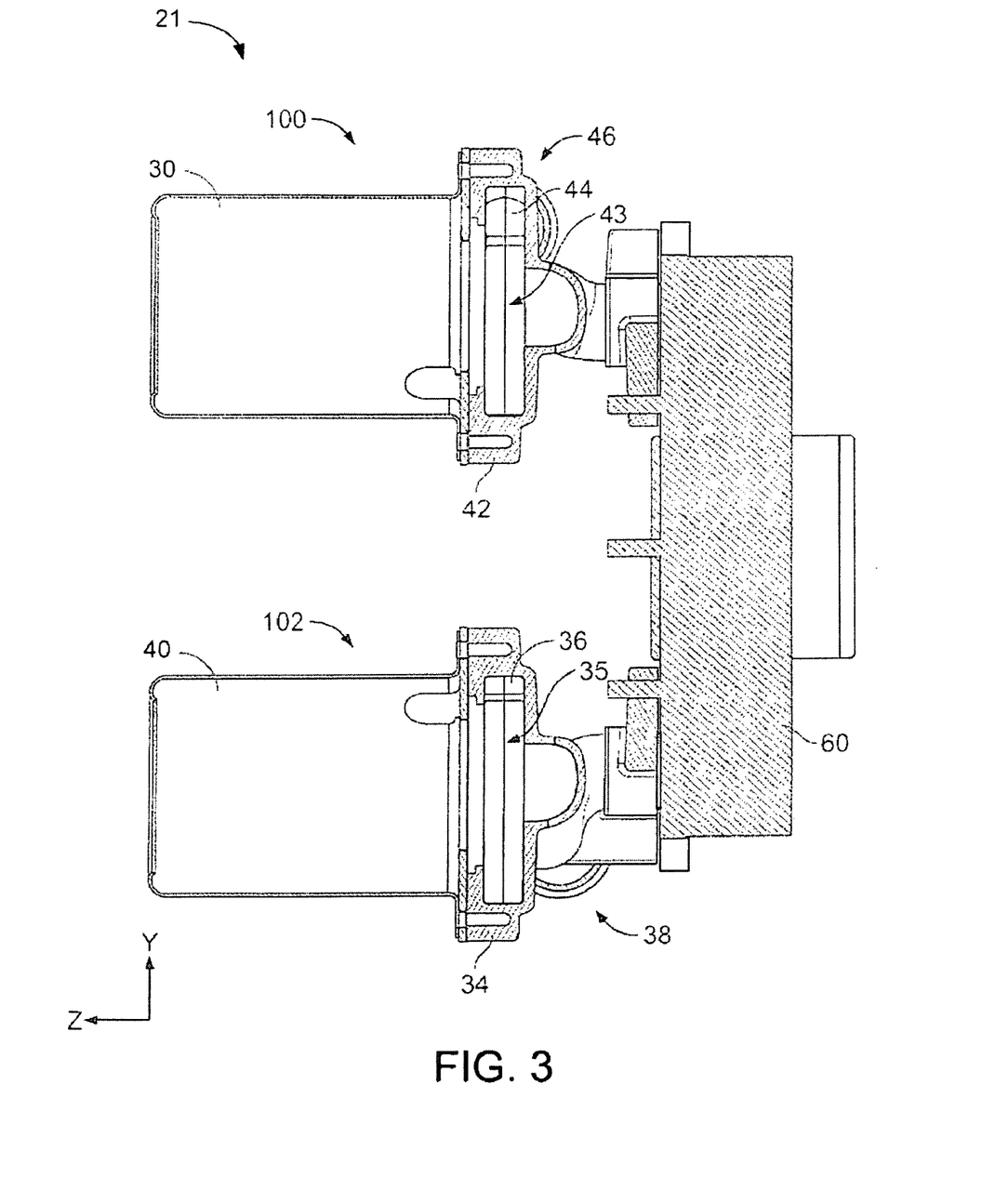
FIG. 3 is a cross-sectional view of the integrated fixture shown in FIG. 2.
Figure 4:
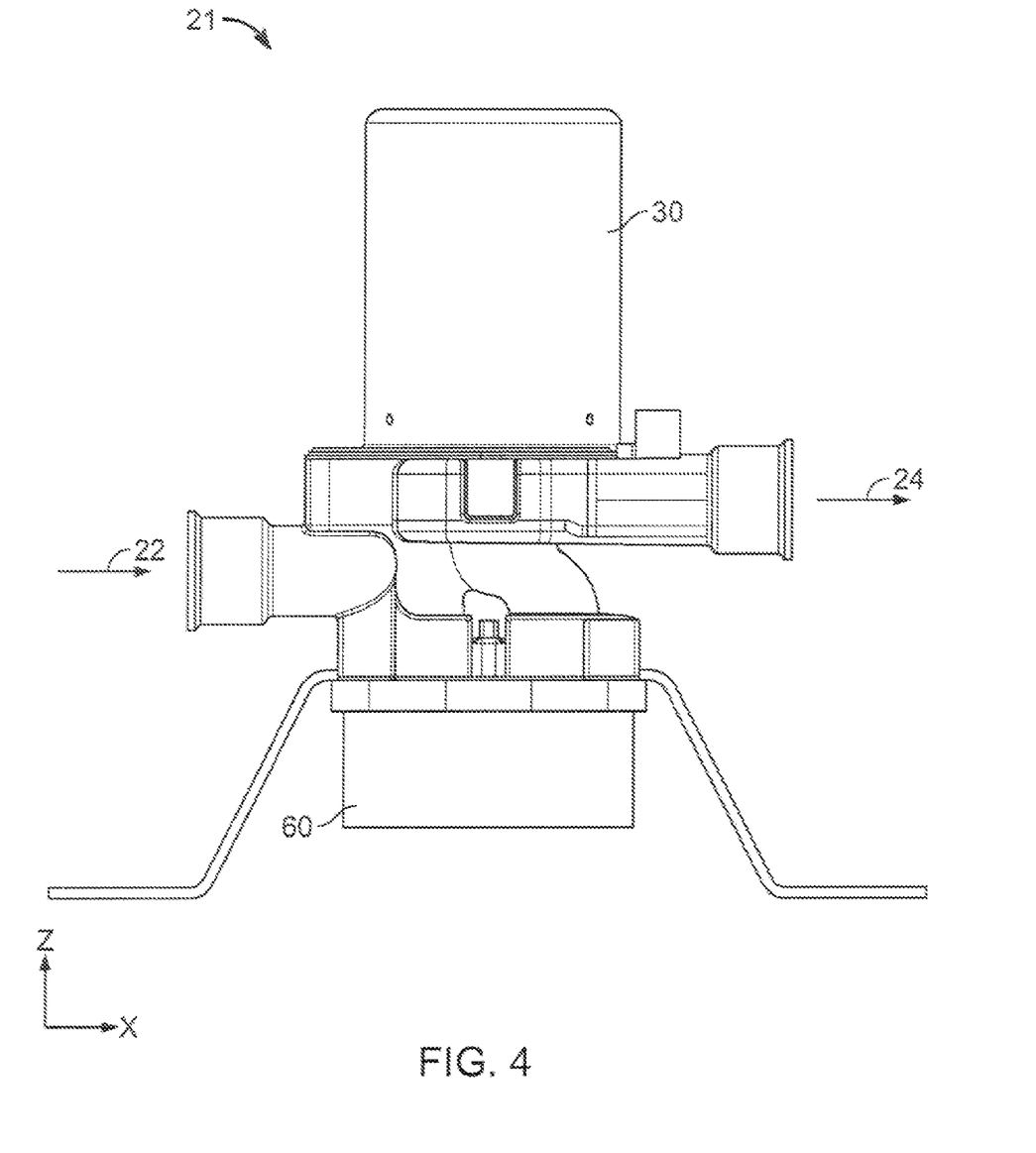
FIG. 4 is a side view of the integrated fixture shown in FIG. 2.

FIGS. 2-4 show the heat exchange fixture 21 according to one implementation of the invention. This fixture is described in detail in U.S. Pat. No. 7,044,398, the complete disclosure of which is incorporated herein by reference. The integrated fixture 21 (formed of bronze, plastic, or other material consistent with the applied system conditions) includes a first casting 100 defining a solar collector supply port 22 and solar collector return port 24, and a second casting 102 defining a water heater supply port 26 and water heater return port 28. Each of the ports has a threaded connection (but any of the known alternative plumbing connections, e.g., sweated, could be substituted).

Referring to FIG. 2, a collector circulator pump 30 (P1 in FIG. 1) is bolted to flange 34 of the first casting 100. The impeller 35 of the circulator pump 30 is received in a volute 36, formed in the first casting. Liquid flows into the circulator pump 30 at inlet 38, and exits at an outlet (not shown) at the periphery of the volute. An internal passage within the casting connects the pump outlet to the solar collector return port 24.

A water heater circulator pump 40 (P2 in FIG. 1) is bolted to flange 42 of the second casting 102. The impeller 43 of the water heater circulator pump 40 is received in volute 44, formed in the second casting. Liquid flows into the water heater pump at an inlet (not shown), and exits at an outlet 46 at the periphery of the volute. An internal passage within the casting connects the pump outlet to the water heater supply port 26.

A controller (controller 16 of FIG. 1) is not shown in FIGS. 2-5, but is in electrical communication with the pumps and is mounted on or inside the fixture 21.

Water from the solar collector loop, i.e., water that has been heated by solar collector 10, enters the first casting through the solar collector supply port 22, passes through one side of heat exchanger 60, and then leaves the first casting through the solar collector return port 24. At the same time, water circulating in the water heater loop enters the second casting through the water heater return port 28, passes through the other side of the heat exchanger, and leaves the second casting through the water heater loop supply port 26. The water in the two loops flows through the heat exchanger in opposite directions, as indicated by the arrows in FIG. 1. As the heated water flows through the heat exchanger, heat is transferred across a separating wall (not shown) of the heat exchanger to the liquid returning from the water heater loop at return port 28, heating this liquid prior to its delivery to the water heater and thus to the domestic hot water system.

Because the two streams of water are isolated from each other within the heat exchanger, the water in the water heater loop may be used as potable water, and the liquid in the solar collector loop can contain additives or contaminants that would be unacceptable in potable water, for example antifreeze (glycols).

Figure 5:
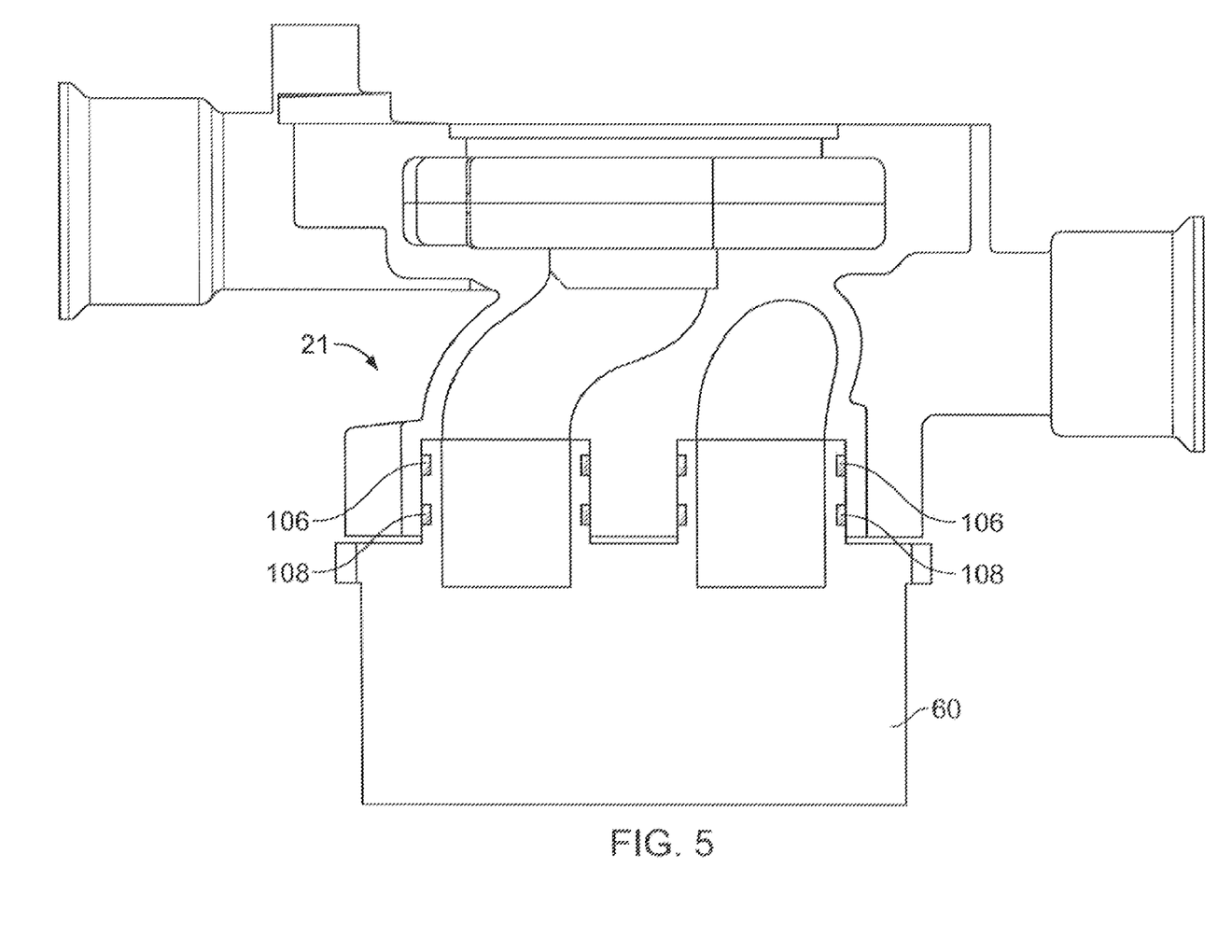
FIG. 5 is cross-sectional view of an integrated fixture showing a double sealing ring arrangement which may be used to seal between the heat exchanger and fixture.

In some preferred implementations, the heat exchanger 60 is replaceable. In the embodiment shown in FIGS. 2-4, the heat exchanger is bolted to the integrated fixture. For example, as shown in FIG. 5 a pair of sealing rings 106, 108 may be provided at each casting/heat exchanger interface to ensure a water-tight seal. The sealing rings are preferably arranged generally parallel to each other and spaced apart along the length of the interface, as shown in FIG. 5.

Figure 2A:
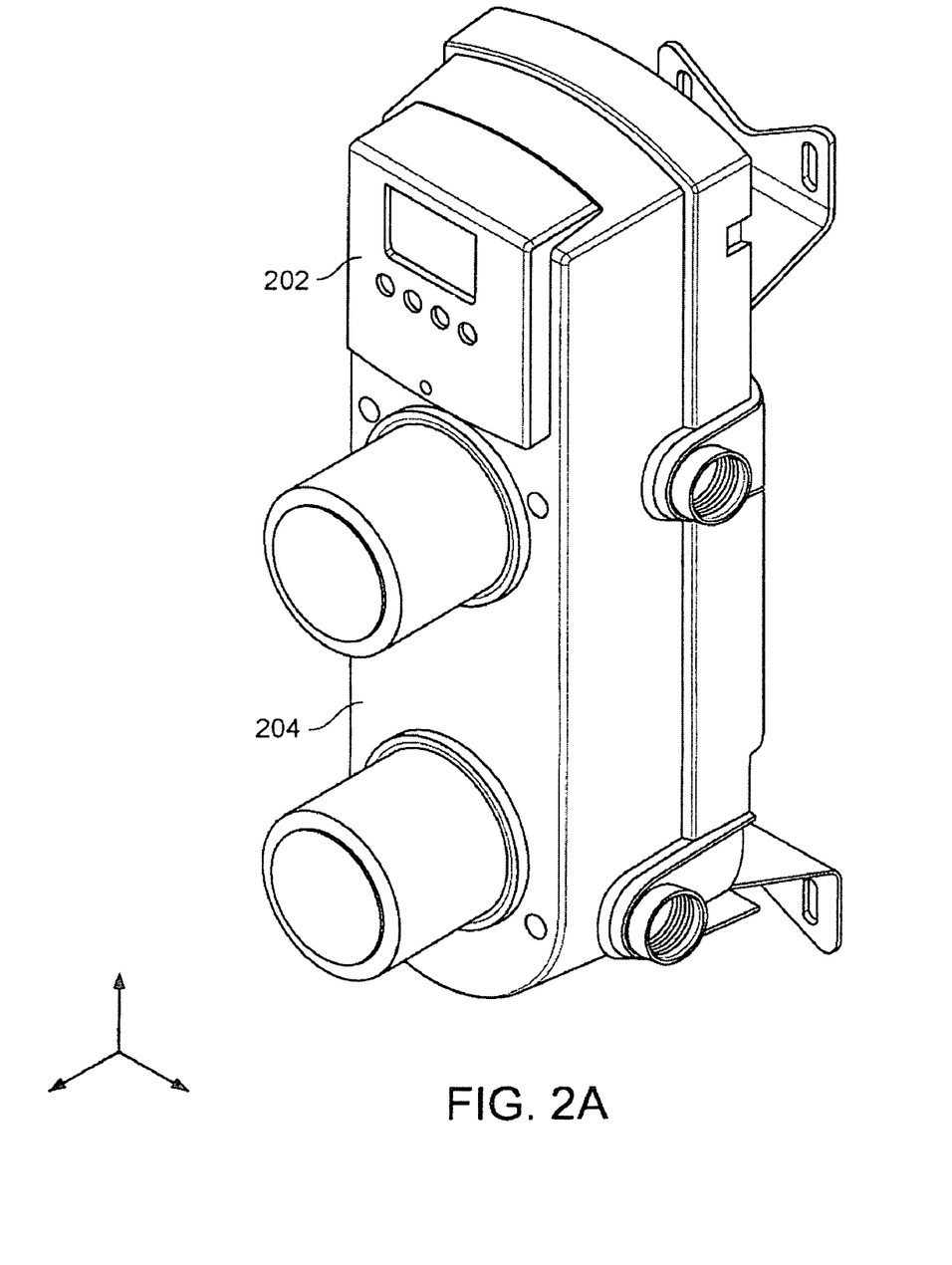
FIG. 2A is a perspective view of an integrated fixture similar to that shown in FIG. 2, disposed within a housing and ready for use.

The integrated fixture is sized and configured to permit easy mounting of the fixture to a wall panel. For example, as shown in FIG. 2A the integrated fixture may include a housing 204 and an electronic system control panel 202. The electronic system controls can be mounted in any desired location, e.g., on the pumps, the integrated fixture, or the support panel.

The integrated fixture may be comprised of a plurality of individual castings that have close-fitting, mating connections that are sealed by o-ring type seals. For example, in the implementation shown in FIGS. 2 and 3 the integrated casting is formed of three elements that are bolted together: a heat exchanger 60 (e.g., a braised plate heat exchanger) and the two individual castings 100 and 102 discussed above. Typically, bolts or other mechanical fasteners hold the plurality of individual castings together, as shown. The connections between the individual castings are not of the type used routinely for making connections between plumbing fittings in the field (e.g., sweat or threaded connections). The plurality of individual castings would be assembled at the factory and delivered to the customer as an assembled unit.

The implementation described above may be used to heat the water used as hot water in a domestic water system, for heating, such as radiant loop heating, or for transferring heat from a higher-temperature loop to a lower-temperature loop in a different type of heating system, for example a baseboard heating system in which different temperatures are used in different loops. Similarly, while a domestic water heater is shown in FIG. 1, other types of heating units may be used, such as boilers. For example, in the system shown in FIG. 6, the domestic water heater is replaced by a storage tank 112.

Figure 6:
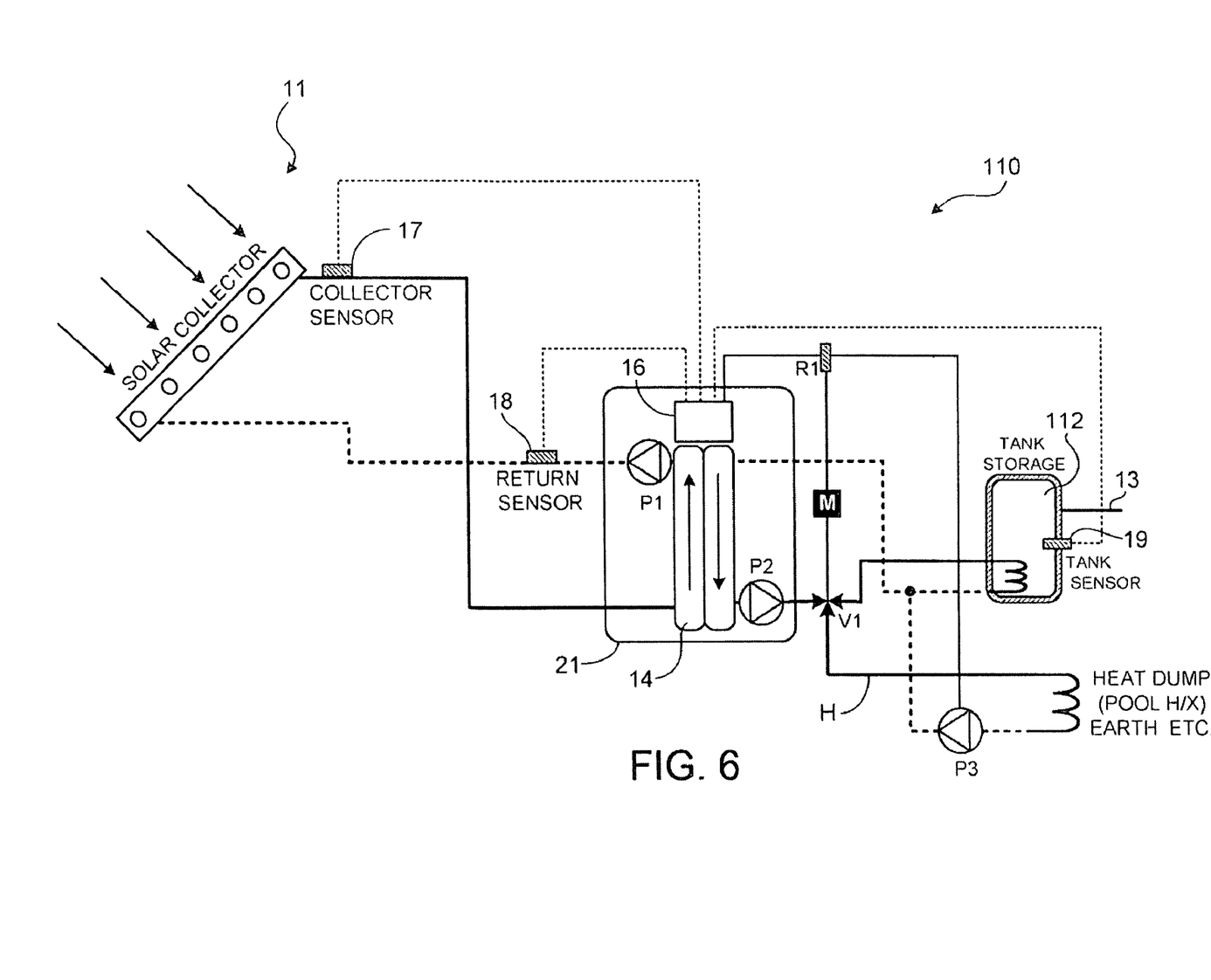
FIG. 6 is a schematic of a heating system using heat from a solar heat source according to an alternate implementation.

In some cases, it is desirable to provide the systems shown in FIG. 1 with a heat dump feature. For example, as shown in FIG. 6, system 110 includes, in addition to the loops described above, a heat dump loop H. When the temperature at the tank exceeds the predetermined value $T_{max}$, discussed above, water is circulated through a heat dump 200, e.g., a large thermal mass, by a heat dump pump P3. Thus, if the temperature measured by the tank sensor 19 rises above $T_{max}$, the controller 16 turns off both P1 and P2, operates a diverting valve V1, and turns P3 on. If the controller 16 receives a "shut-off" demand (e.g., a signal from a sensor associated with the heat dump) while operating P3, the controller turns P1 and P3 off. During heat dump operation, the controller operates P1 (or shuts P1 off) as dictated by the actual temperature differential ($\Delta T_a$) between the collector and tank, as discussed above.

Figure 7:
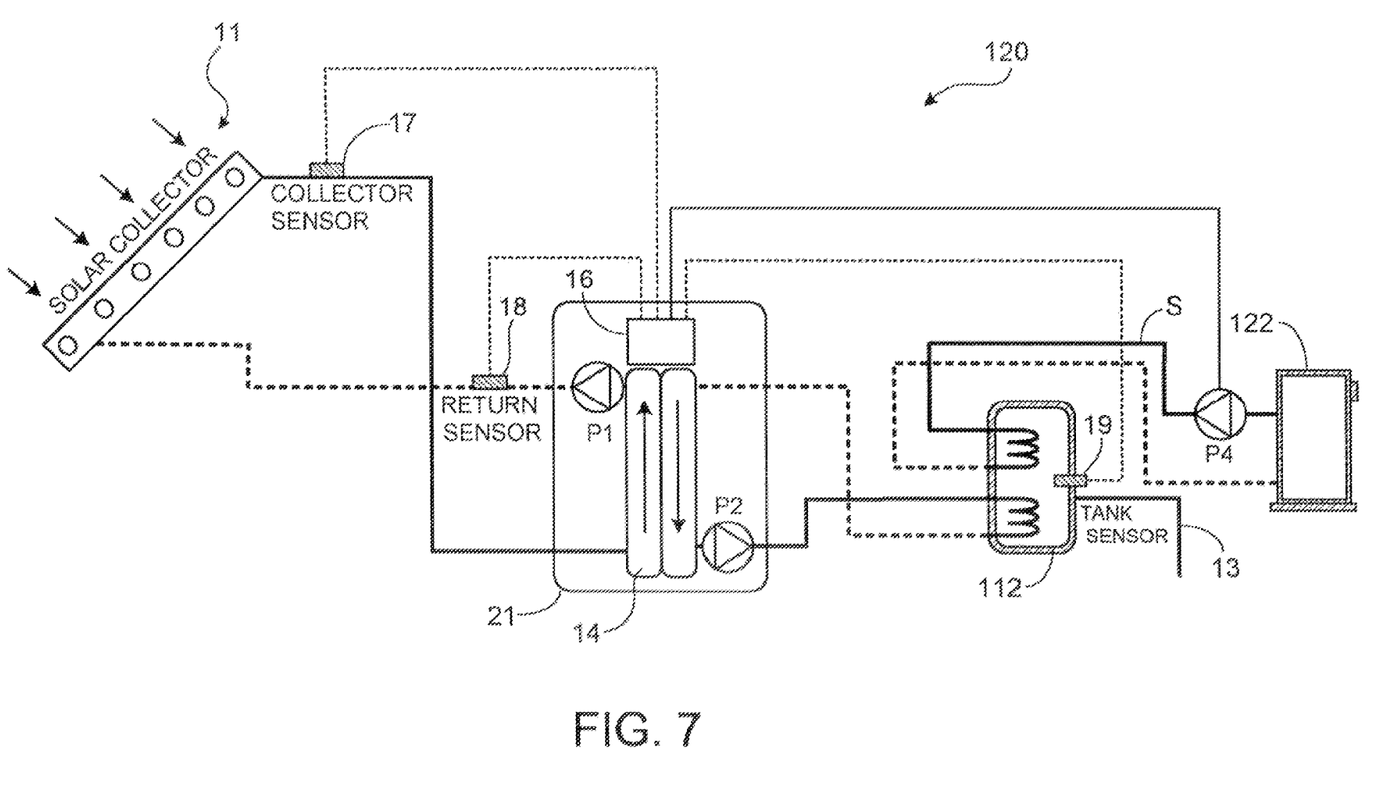
FIG. 7 is a schematic of a heating system using heat from a solar heat source according to another alternate implementation.

In some cases, it may be desirable to supplement the heat supplied by the solar collector with a back-up heat source. A system 120 employing a back-up heat source is illustrated in FIG. 7. System 120 includes, in addition to the loops described above, a supplementary heat loop S. If during operation the temperature measured by the collector sensor 17 falls below the predetermined minimum collector temperature setpoint ($T_{min}$) the controller turns off pumps P1 and P2, as discussed above. When this has occurred, once the temperature measured by the tank sensor 19 drops below the minimum tank temperature setpoint $T_{min}$, the controller turns on supplement pump P4. Pump P4 circulates water from a back-up heat source, e.g., a boiler 122, to the storage tank 112. If the boiler 122 is not already on, the controller will activate the boiler. Pump P4 will remain on until the predetermined tank setpoint is reached, or until the temperature at the collector sensor indicates that the collector loop can be reactivated.

Other embodiments are within the scope of the claims.

For example, instead of there being threaded pipe connections at the supply and return ports, the integrated fixture could have other types of connections (e.g., sweated, union, barbed, and grooved).

If desired, a replaceable flow-check device (not shown) may be installed in the solar collector supply port.

Many other implementations of the invention other than those described above are within the invention, which is defined by the following claims.

What is claimed is:

1. A method of supplying heat to a solar hot water system including a higher-temperature loop and a lower-temperature loop, the method comprising:
   (a) providing a transfer system for transferring heat from the higher-temperature loop to the lower-temperature loop, the transfer system comprising (i) a higher-temperature loop pump; (ii) a lower-temperature loop pump, (iii) a heat exchanger in fluid communication with both the higher-temperature loop and the lower-temperature loop; and (iv) a controller, integrated with the pumps and heat exchanger in a single unitary fixture, configured to control the operation of the lower-temperature loop pump and higher-temperature loop pump;

(b) heating liquid in the higher-temperature loop with a solar heating unit;
(c) delivering liquid from the higher-temperature loop to the heat exchanger, so that the liquid passes through a first side of the heat exchanger,
(d) delivering liquid circulating in the lower-temperature loop to the heat exchanger so that the liquid passes through a second side of the heat exchanger, receiving heat from the liquid in the higher-temperature loop,
(e) delivering a portion of the liquid in the lower-temperature loop that has been heated in the heat exchanger to an end use;
(f) determining the temperature differential between the temperature of the liquid exiting the solar heating unit and the temperature of the liquid in the lower-temperature loop after it has exited the heat exchanger, and
(g) controlling delivery of liquid from the higher-temperature and lower-temperature loops to the heat exchanger based on the temperature differential, to maintain a set-point temperature differential ($\Delta T_s$) between the solar heating unit and the end use, by:
  (i) calculating the actual temperature differential between the solar heating unit and the end use;
  (ii) turning both pumps on when the temperature differential is greater than $\Delta T_s$ and running the pumps at a speed sufficient to transfer heat from the solar heating unit to the end use;
  (iii) turning off one or both pumps when the temperature in the lower-temperature loop after it has exited the heat exchanger exceeds a predetermined maximum; and
  (iv) turning off one or both pumps when the temperature at the exit of the solar heating unit falls below a predetermined minimum.

2. The method of claim 1 further comprising turning off operation of both of the pumps when the temperature at the exit of the solar heating unit falls below a predetermined minimum.

3. The method of claim 2 wherein the system further includes a supplemental heat source and a reservoir in communication with the lower-temperature loop, and the method further comprises activating a supplemental pump when temperature at the exit of the solar heating unit falls below the predetermined minimum, to deliver heated liquid through a supplemental loop from the supplemental heat source to the reservoir.

4. The method of claim 1 further comprising activating a heat dump pump when the predetermined maximum is exceeded, and diverting liquid from the lower-temperature loop to a heat dump.

5. The method of claim 1 further comprising (e) using the liquid in the lower-temperature loop as potable water.

6. The method of claim 1 further comprising adding to the liquid in the higher-temperature loop an additive that would not be suitable for use in potable water.

7. The method of claim 1 wherein the solar heating unit comprises a roof-mounted collector.

8. The method of claim 1 wherein the end use comprises a water heater for a domestic water supply.

* * * * *